US009516302B1

(12) United States Patent
Cao et al.

(10) Patent No.: US 9,516,302 B1
(45) Date of Patent: Dec. 6, 2016

(54) AUTOMATED FOCUSING OF A CAMERA MODULE IN PRODUCTION

(71) Applicant: Amazon Technologies, Inc., Seattle, WA (US)

(72) Inventors: DongQing Cao, San Jose, CA (US); Wei Li, Cupertino, CA (US); Eddie Alex Azuma, Pleasanton, CA (US)

(73) Assignee: Amazon Techologies, Inc., Reno, NV (US)

( * ) Notice: Subject to any disclaimer, the term of this patent is extended or adjusted under 35 U.S.C. 154(b) by 185 days.

(21) Appl. No.: 14/542,035

(22) Filed: Nov. 14, 2014

(51) Int. Cl.
*H04N 17/02* (2006.01)
*H04N 17/00* (2006.01)
*G02B 7/00* (2006.01)
*G02B 7/09* (2006.01)

(52) U.S. Cl.
CPC ............ *H04N 17/002* (2013.01); *G02B 7/003* (2013.01); *G02B 7/09* (2013.01)

(58) Field of Classification Search
CPC .. H04N 17/002; H04N 17/02; H04N 5/23212; G02B 7/003; G02B 7/09
USPC ........................................................ 348/188
See application file for complete search history.

(56) References Cited

U.S. PATENT DOCUMENTS

| 2010/0188558 | A1* | 7/2010 | Gamadia ............ H04N 5/23212 348/345 |
| 2012/0013760 | A1* | 1/2012 | Parodi-Keravec . G01M 11/0264 348/222.1 |
| 2013/0329122 | A1* | 12/2013 | Geisler .............. H04N 5/23212 348/345 |

* cited by examiner

Primary Examiner — Michael Lee
(74) Attorney, Agent, or Firm — Sutherland Asbill & Brennan LLP

(57) ABSTRACT

Embodiments of the disclosure permit automated focusing of a camera module during assembly. The camera module can include an imaging device and a lens assembly that is movably mounted to a housing of the camera module. In certain embodiments, the automated focusing can include iteratively imaging a fixed set of reference markings, and successively quantifying the focusing quality of the camera module based at least on a defocus metric defined as a difference between a current spacing and a calibrated spacing among two of the imaged reference markings. The magnitude and sign of the defocus metric can guide, respectively, a magnitude and direction of the movement of the lens assembly relative to the imaging device. After successive adjustments yield a desired focusing quality of the camera module, the lens assembly can be locked in position and can be further processed according to a suitable camera module integration flow.

20 Claims, 10 Drawing Sheets

| Defocus Shift (μm) | d (μm) | Δ (μm) | Pixel Count |
|---|---|---|---|
| 30 | 1.1463 | 19.00 | 17.0 |
| 20 | 1.1400 | 12.67 | 11.3 |
| 10 | 1.1337 | 6.33 | 5.7 |
| 5 | 1.1305 | 3.17 | 2.8 |
| 0 | 1.1273 | 0.00 | 0.0 |
| -5 | 1.1242 | -3.17 | -2.8 |
| -10 | 1.1210 | -6.33 | -5.7 |
| -20 | 1.1147 | -12.67 | -11.3 |
| -30 | 1.1083 | -19.00 | -17.0 |

| Defocus Shift (μm) | d (μm) | Δ (μm) | Pixel Count |
|---|---|---|---|
| 30 | 1.14270 | 17.85 | 15.9 |
| 20 | 1.13710 | 12.25 | 10.9 |
| 10 | 1.13030 | 5.45 | 4.9 |
| 5 | 1.12695 | 2.10 | 1.9 |
| 0 | 1.12485 | 0.00 | 0.0 |
| -5 | 1.12255 | -2.30 | -2.1 |
| -10 | 1.11820 | -6.65 | -5.9 |
| -20 | 1.11320 | -11.65 | -10.4 |
| -30 | 1.10590 | -18.95 | -16.9 |

AUTOMATED FOCUSING OF A CAMERA MODULE IN PRODUCTION

BACKGROUND

Advances in digital camera technology have permitted the mass production of a vast number of compact electronic devices having imaging functionality that permits recording digital media in various formats (motion picture, still picture, and the like). As such, camera modules that enable the imaging functionality of such devices are integrated in specific, rather complex processing flows. Part of the processing flows can include automated focusing of the camera modules.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various embodiments of the disclosure can be implemented in many different forms and should not be construed as limited to the implementations set forth herein. Like numbers refer to like elements throughout.

DETAILED DESCRIPTION

Figure 1:
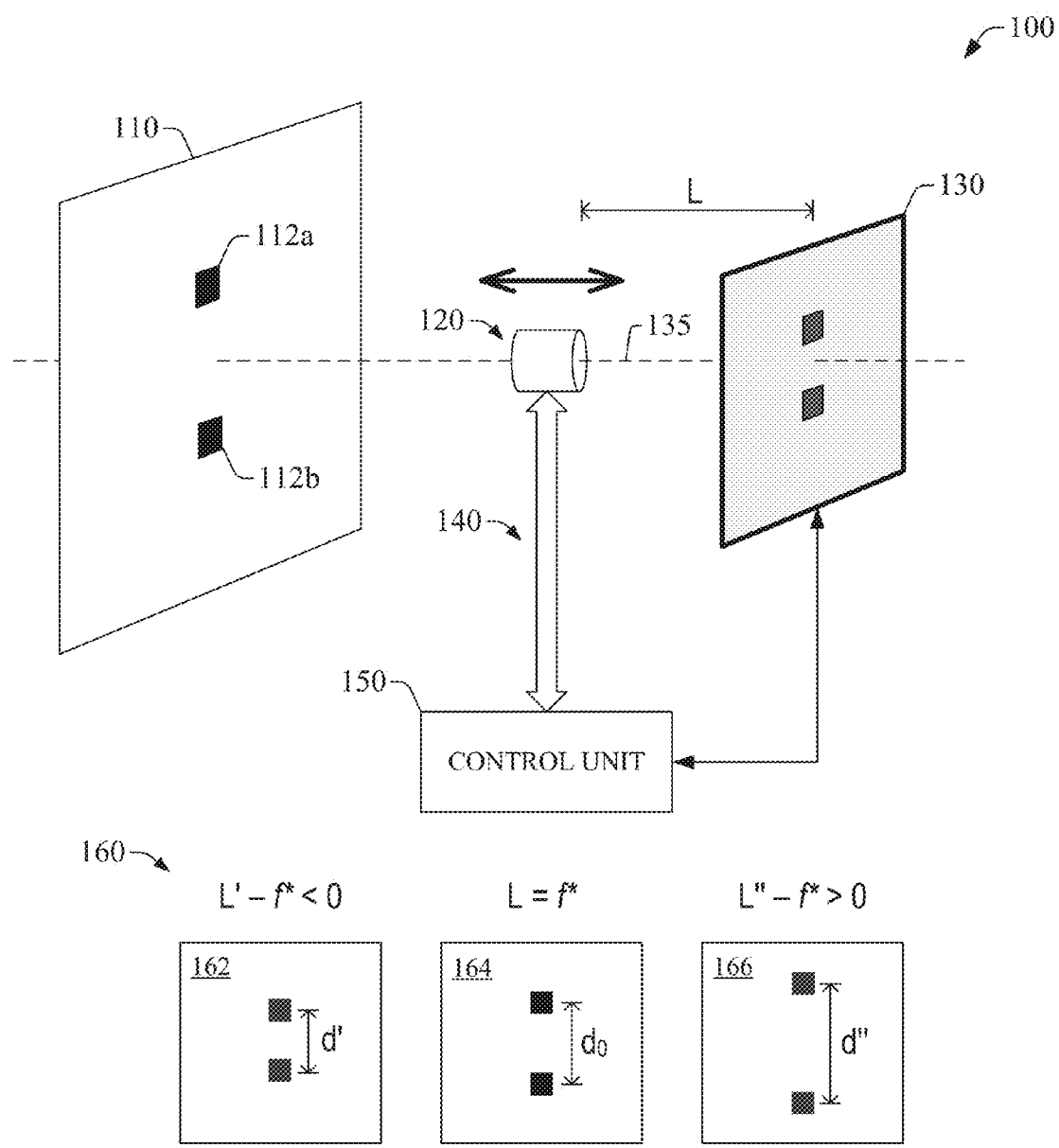
FIG. 1 presents an example environment for automated focusing of a camera module in accordance with one or more embodiments of the disclosure.

The disclosure recognizes and addresses, in at least certain embodiments, the issue of automated focusing of camera modules in portable or otherwise compact electronic devices with digital imaging functionality. More specifically, embodiments of the disclosure can address the issue of automated focusing within the end-of-line (EOL) portion of a camera module processing flow in production or assembly. Such automated focusing generally permits achieving a satisfactory or otherwise desired focusing quality of a camera module by iteratively adjusting the position of a lens assembly relative to an imaging device. Thus, the automated focusing described herein can be one of several technologies affecting the quality and cost of camera modules. The camera module focused in accordance with the automated focusing of this disclosure can be utilized for digital imaging, and can be integrated or otherwise incorporated into various types of electronic devices. For example, the electronic devices that can leverage the camera modules assembled in accordance with aspects of this disclosure can be embodied in or can include a portable computing device, such as a mobile tablet computer, an electronic-book reader (also referred to as e-reader), a mobile telephone (e.g., a smartphone), and the like. In another example, the electronic devices can be embodied in or can include a wearable computing device, such as a watch, goggles or head-mounted visors, or the like. In yet another example, the electronic devices can be embodied in or can include portable consumer electronics equipment, such as a camera, a media reproduction device, a portable television set, a gaming console, a navigation device, and the like. The embodiments of the disclosure can be applied to any camera module in which a lens assembly is movably mounted to a housing of the camera module. The camera module can be embodied in or can include a fixed-focus (FF) module or an auto-focus (AF) module. For example, each of the lens assembly and the housing can define a thread that permits movably mounting the lens assembly into the housing by threading the lens assembly into the housing. For another example, the lens assembly can be moved relative to the imaging device of the camera module via an active alignment mechanism, without a thread on the lens assembly.

As described in greater detail below, in certain embodiments for automated focusing of a camera module during assembly thereof, the automated focusing can include successively imaging a fixed set of reference markings and quantifying the focusing quality of the camera module using the imaged reference markings. The reference markings (or reference graphical objects) can be disposed at predetermined respective positions within a test chart, each of the markings having a specific geometric shape and being arranged in a predetermined orientation relative to other marking(s) in the test chart. For instance, a pair of the reference markings can be arranged in a vertical orientation, a horizontal orientation, along a diagonal direction in the test chart, or along another direction having an inclination different from 45 degrees with respect to a base of the test chart. The test chart can be embodied in a spatial frequency response (SFR) plus chart, or other types of charts. An image of the fixed set of reference markings can be generated by the camera module for a respective arrangement of a lens assembly of the camera module relative to an imaging device thereof. A current focusing quality of the camera module for a specific arrangement of the lens assembly and the imaging device can be quantified or otherwise determined using two of the imaged reference markings. More specifically, in certain implementations, the current focusing quality can be quantified using a defocus metric defined as a difference between a current separation distance among the two imaged reference markings and a calibrated separation distance between such markings. The calibrated separation distance can correspond to an expected spacing between the two reference markings in an image obtained in a focused configuration in which the imaging device of the camera module is disposed at a distance from the lens assembly corresponding to the focal distance thereof. The defocus metric can be representative of a shift from a focused arrangement of the lens assembly relative to an imaging device of the camera module, and thus, it can quantify the amount of defocusing (or lack of focus) of the camera module.

For a current focusing quality that is below a threshold, a current arrangement of the lens assembly and the imaging device of the camera module can be adjusted by moving the lens assembly based at least on a current defocus metric. The magnitude and sign of the current defocus metric can dictate, respectively, a magnitude and direction of a movement of the lens assembly relative to the imaging device. More specifically, in one aspect, the sign of the current defocus metric can be representative of a direction in which the lens assembly can be displaced relative to the imager in order to improve the focusing of the camera module. In one implementation, the defocus amount and direction can be determined by (i) determining a current spacing between the two reference markings in an image of the test chart formed at the imaging device for a current distance between the lens assembly and the imaging device; and (ii) comparing the current spacing to a calibrated spacing between such markings, where the calibrated spacing would be obtained when the imaging device is positioned at a distance from the lens assembly corresponding to an effective focal length thereof. In a scenario in which the current spacing is less than the calibrated spacing, the sign of the defocus metric is negative and the lens assembly is to be moved away from the imaging device. In a scenario in which the defocus metric is positive (e.g., the current spacing is larger than the calibrated spacing), the lens assembly is to be moved toward the imaging device.

A new image of the fixed set of reference markings can be generated by the camera module upon or after adjusting the position of the lens assembly, and the focusing quality can be re-quantified. For a focusing quality that remains below threshold, further adjustments to the position of the lens assembly can be implemented based on currently determined defocus metrics until a satisfactory or otherwise desired focusing quality is achieved. After successive adjustments yield a satisfactory focusing quality, the lens assembly can be locked in position and can be further processed according to a suitable camera module integration flow. For instance, the lens assembly can be affixed or otherwise bonded to the housing of the camera module using a suitable adhesive, such as a resin, a polymer (e.g., an epoxy or a silicone gel) or the like. In certain implementations, the adhesive can be cured using ultraviolet (UV) light or visible light in order to produce a mechanically stable bond. It can be appreciated that, in certain implementations, the focusing quality can be determined by the magnitude of the defocusing metric. Other types of metrics, such as sharpness of an image of the test chart formed by the camera module, can be utilized after an initial satisfactory focusing quality is obtained.

Embodiments of the disclosure can provide accurate automated focusing with imaging sensors or devices having different pixel sizes, including small pixel sizes of about 1.12 µm. In one or more embodiments, the pre-height of a camera module can provide the position of a lens assembly relative to the housing of the camera module with an accuracy of about 30 µm to about 50 µm. Such accuracy combined with the disclosed defocus metric, including its magnitude and sign, can permit a rapid automated focusing of the camera module. As such, embodiments of the disclosure can speed up the camera module assembly processes significantly, with comparable or better imaging quality in the assembled camera modules. In addition, the increased processing speed for the assembly of a camera module can lower the costs to assemble camera modules for portable or otherwise compact devices having digital imaging functionality. Further, at least certain embodiments of the disclosure can improve optical center performance, at least in terms of better optical centering and less shading, by significantly reducing the overall movement range (e.g., turning range) of a lens assembly in a camera module due to pre-height configurations at or nearly at nominal focus position. It should be appreciated that by reducing the movement of the lens assembly, the exposure of the camera module to particulates or other types of contaminants can be reduced.

With reference to the drawings, FIG. 1 illustrates an example environment 100 for automated focusing of a camera module in accordance with one or more embodiments of the disclosure. The automated focusing can rely or otherwise leverage a test chart 110 (which also may be referred to as testing chart 110) having markings embedded thereon. As illustrated, the reference markings can include at least two markings 112a and 112b, each having a specific shape and size. The markings 112a and 112b can be disposed at a predetermined relative distance (d) and in a predetermined relative orientation. In the example environment 100, a lens assembly 120 included in the camera module can receive light reflected off the surface of the test chart 110, and can focus at least a portion of the received light onto an imaging device 130. As illustrated, the lens assembly 120 can be positioned at a distance L from the imaging device 130. As illustrated, the lens assembly 120 can have a finite size and the distance L can be measured with respect to any point within the lens assembly 120, such as one of the ends thereof. In one embodiment, the lens assembly 120 can include one or more lenses (not depicted) attached to a mounting member (not depicted). The one or more lenses can be embodied in or can include solid-state lenses formed from glass or other transparent or semi-transparent materials, and/or liquids contained in a suitable solid (flexible or otherwise) casing. The mounting member can permit mounting or otherwise attaching the lens assembly 120 to a housing of the camera module (not depicted). In certain embodiments, the mounting member can be embodied in or can include a solid barrel that can be disposed into an opening defined by the housing of the camera module. To at least that end, in certain embodiments, the barrel and the opening each can be wholly or partially threaded, and therefore, the barrel can be threaded into the opening. It should be appreciated that other structures for the mounting member can be contemplated in this disclosure.

The imaging device 130 can include one or more photosensitive elements that can generate imaging signals (such as an electric signal) and/or other type of image data in response to light incident onto a surface of the imaging device 130. More specifically, in one example, the imaging device 130 can include an array of photosensitive elements, where each of the photosensitive elements can generate an imaging signal in response to receiving light having wavelengths within a portion of the electromagnetic spectrum. The received light can be monochromatic or polychromatic. As such, in response to the light focused by the lens assembly 120, the imaging device 130 can generate image data representative or otherwise indicative of an image of the test chart 110, including the markings 112a and 112b, that is formed on the surface of the imaging device 130. In certain embodiments, at least one of the photosensitive elements can be formed from a semiconductor material (such as Si, Ge, a III-V semiconductor, a II-VI semiconductor, or the like) having a suitable energy gap that can provide sensitivity to a range of light wavelengths. In one of such embodiments, each of the photosensitive element(s) can have a planar surface of rectangular section having a first base length (e.g., 1.12 µm) and a second base length (e.g., 1.12 µm). In addition or in other embodiments, each of the photosensitive elements may be referred to as a pixel sensor or a pixel.

It should be appreciated that the imaging data generated by the imaging device 130 depends on the distance between the lens assembly 120 and the imaging device 130. In a scenario in which the distance is substantially equal or equal to the back focal length $f_0$ of the lens assembly 120, a camera module (not depicted) including the lens assembly 120 and the imaging device 130 is said to be focused. The length $f_0$ corresponds to the distance from the vertex of the optical surface in the lens assembly 120 that is closest to the image plane of the lens assembly 120, the vertex defined as the intersection point between such an optical surface and the optical axis of the lens assembly 120. A nominal or idealized focal length f for the lens assembly 120 can be available (e.g., measured, or simulated or otherwise computed) based on the specific configuration of one or more lenses and other optical elements that may be included in the lens assembly 120. In one example, the nominal or idealized focal length f can be a nominal back focal length of the lens assembly 120. Therefore, the lens assembly 120 can be initially positioned at a distance substantially equal to f relative to the imaging device 130. Such a distance can be referred to as a pre-height of the camera module. Accordingly, by providing an initial spatial arrangement of the lens assembly 120 and the imaging device 130, the automated focusing in accordance with the disclosure can include successive adjustments of the position of the lens assembly 120 with respect to the imaging device 130 until the camera module is focused or satisfactorily focused. To at least such an end, in certain embodiments, the images of the markings 112*a* and 112*b* that can be formed at the imaging device 130 for a distance d between the lens assembly 120 and the imaging device 130 can be utilized to determine a defocus metric $\Delta$ indicative or otherwise representative of a deviation from a focused configuration of the camera module. The defocus metric $\Delta$ can have a magnitude and a sign (e.g., it can be positive or negative) and can provide a guide for the magnitude and direction of a displacement of the lens assembly 120 intended to achieve a focused configuration of the camera module. More specifically, the defocus metric $\Delta$ can be defined, and therefore determined, as the difference between a separation distance (or spacing) d between respective images of the markings 112*a* and 112*b* and a reference separation distance $d_0$ is a calibrated separation distance between the respective images of the reference markings 112*a* and 112*b* in a focused image of the test chart 110 obtained by the camera module in a focused configuration.

Figure 2:
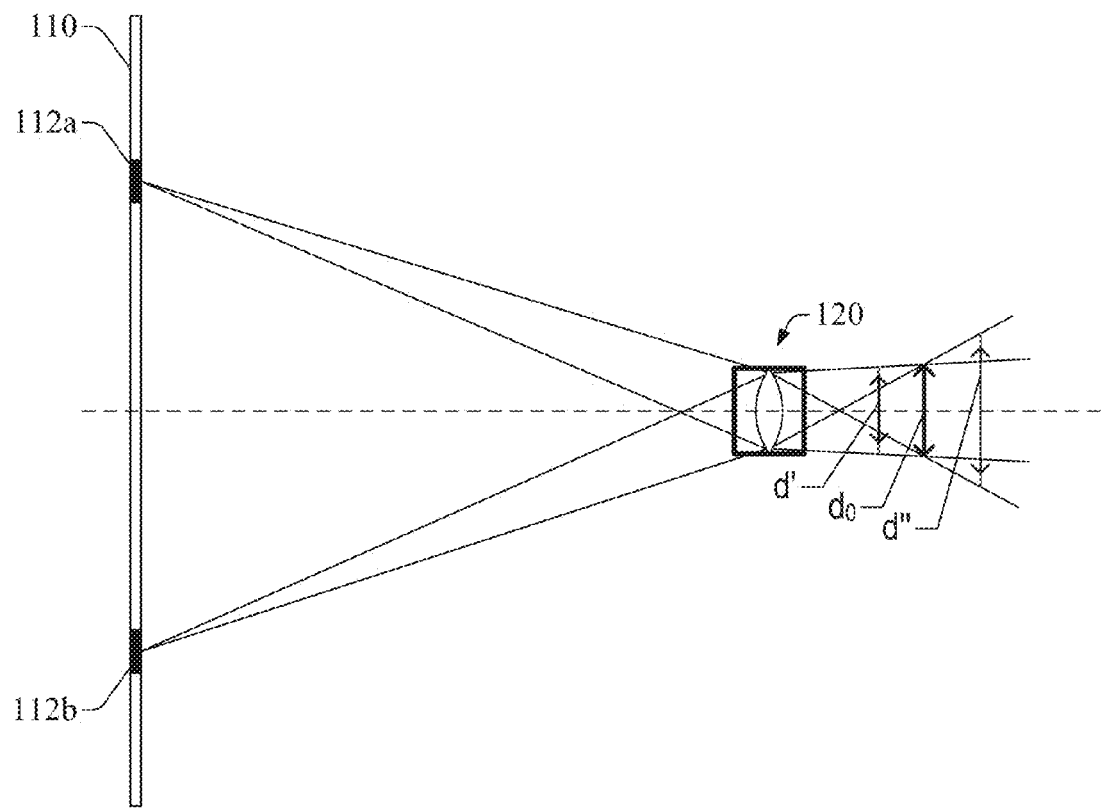
FIG. 2 presents a schematic side-view ray-tracing diagram for various arrangements of a lens assembly and an imaging device in a camera module included in the example environment of FIG. 1.

In order to illustrate the utilization of the defocus metric $\Delta$ in the automated focusing of a camera module in accordance with aspects of this disclosure, multi-panel diagram 160 presents schematically three focusing scenarios for three different configurations having respective arrangements of the lens assembly 120 relative to the imaging device 130. In panel 162, the lens assembly 120 is disposed at a distance L=L' from the imaging device 130, where L'<f*, where f* is the actual focal length of the lens assembly 120. A described herein, in certain scenarios f* is equal or substantially equal to $f_0$. As such, without intending to be bound by theory and/or modeling, the image of the test chart 110 can be out-of-focus and the respective images of the markings 112*a* and 112*b* can be separated by a distance d'<$d_0$. Accordingly, the defocus metric $\Delta'=d'-d_0$, which is a finite, negative parameter because d'<$d_0$. In turn, panel 164 illustrates a focused configuration in which the distance L between the lens assembly 120 and the imaging device 130 equals the actual focal length f*. Therefore, without intending to be bound by theory and/or modeling, the spacing between the respective images of the markings 112*a* and 112*b* corresponds to the reference separation distance $d_0$, and $\Delta=d_0-d_0=0$. As described herein, such scenario is the sought-after idealized configuration for lens assembly 120. In turn, panel 166 depicts the scenario in which the lens assembly 120 may be disposed at a distance L=L" from the imaging device 130, where L">f*. As such, without intending to be bound by theory and/or modeling, the image of the test chart 110 can be defocused, and can present the markings 112*a* and 112*b* separated by a distance d">$d_0$ because such an image forms behind the focal plane of the lens assembly 120. Accordingly, the defocus metric $\Delta"=d"-d_0$ can be a finite, positive parameter. Therefore, it can be gleaned that the sign of the defocus metric $\Delta$ can suggest or otherwise provide a direction of movement for the lens assembly relative to the imaging device 130. As a further illustration, FIG. 2 presents a schematic side-view ray-tracing diagram 200 related to the scenarios depicted in panels 162, 164, and 166 of the diagram 160 in FIG. 1.

Figure 3A:
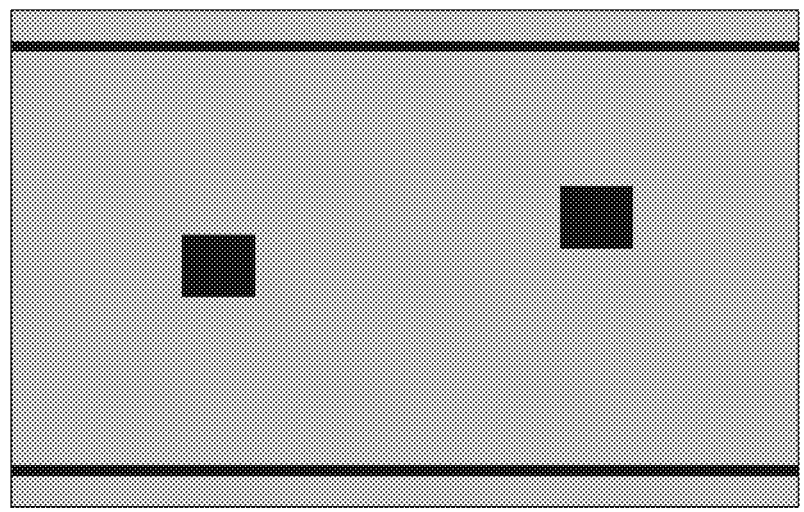
FIGS. 3A and 3B present examples of test charts that can be utilized for automated focusing of a camera module in accordance with one or more embodiments of the disclosure.
Figure 3B:
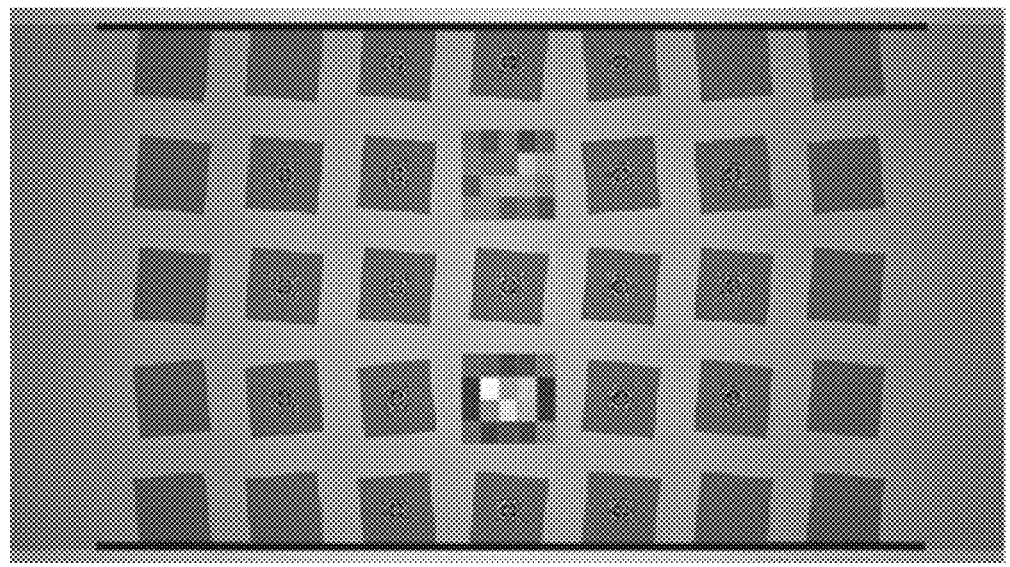

It should be appreciated that while the example test chart 110 includes two reference markings, in certain embodiments, test charts including more than two reference markings can be contemplated. In addition, while the two markings 112*a* and 112*b* are presented as black rectangles aligned in a vertical line, the disclosure is not so limited and other colors, aspect ratios, geometric shapes, and/or relative orientations can be contemplated for a reference marking included in a test chart of this disclosure. One or more reference markings included in a test chart of this disclosure can have different shapes relative to other marking(s) in the test chart. In one example, the aspect ratio of each of the markings 112*a* and 112*b* can be modified to form two elongated bars, which can be disposed parallel to each other in a vertical orientation, a horizontal orientation, along a diagonal direction in the test chart, or along another direction having an inclination different from 45 degrees with respect to a base of the test chart. Similarly, in another example, two or more squares or rectangles can embody the markings 112*a* and 112*b*. At least a pair of such squares or rectangles can be disposed parallel to each other in a vertical orientation, a horizontal orientation, along a diagonal direction in the test chart, or along another direction having an inclination different from 45 degrees with respect to a base of the test chart. It should be appreciated that the farther apart two reference markings (which also may be referred to as objects) are separated, the more accurate the defocus estimation can be. In addition, in embodiments in which the reference markings are embodied in elongated bars or lines, the greater the length of the line or bar, the wider the image field that can be imaged or otherwise probed. It should be further appreciated that certain geometric shapes can simplify the determination of the spacing between two reference markings. For further illustration, FIGS. 3A and 3B present example embodiments of test charts 300 and 350, respectively, that can be utilized for the automated focusing of a camera module in accordance with aspects described herein. It should be appreciated that the example test chart shown in FIG. 3B is commonly utilized in typical technologies for automated focusing of camera modules.

With further reference to FIG. 1, the example environment 100 can include a positioning mechanism 140 (represented by a double-headed arrow) that can be attached or otherwise coupled to the lens assembly 120, and can permit automatically moving the lens assembly 120 with respect to the imaging device 130. A control unit 150 (also referred to as a controller 150) functionally coupled (e.g., communicatively coupled, electrically coupled, mechanically coupled, and/or electromechanically coupled) can cause the positioning mechanism 140 to place the lens assembly 120 at an initial position, and to displace the lens assembly 120 by a specific distance in a specific direction (e.g., towards the imaging device 130 or away from the imaging device 130). In certain implementations, the specific distance can be determined by the magnitude of a defocus metric Δ, and the specific direction can be determined by the sign of the defocus metric Δ. As described herein, in certain embodiments, the control unit 150 can cause the positioning mechanism 140 to place the lens assembly 120 at an initial distance from the imaging device 130 that is equal or substantially equal to a nominal focal length (e.g., a nominal back focal length) of the lens assembly 120. In certain embodiments, the specific distance can be about 5 μm and the movement can be directed towards the imaging device 130. In addition, the specific distance can be about 5 μm and the movement can be directed away from the imaging device 130. The lens assembly 120 also can be moved other distances (e.g., 1 μm, 2 μm, 3 μm, 4 μm, 6 μm, 7 μm, 8 μm, 9 μm, 10 μm, 11 μm, 12 μm, 13 μm, 14 μm, 15 μm, 20 μm, 25 μm, or 30 μm) towards or away from the imaging device 130. As described herein, in at least certain embodiments, the distance and/or direction that the lens assembly is to be moved can be determined using the defocus metric Δ. In certain embodiments, the distance L and the defocus metric Δ can be linearly related, and a predetermined estimate of the linear coefficient in a linear relationship between L and A can determine the magnitude of the displacement of the lens assembly 120 relative to the imaging device 130. It should be appreciated that the magnitude of the displacement can be configured to be suitably large for the imaging device 130 to sense a change in the image of the reference markings 112a and 112b that is formed at the imaging device 130. In certain embodiments, the control unit 150 can be functionally coupled to the imaging device 130 and can receive image data from the imaging device 130 or a component thereof. As described herein, at least a portion of the image can be representative or otherwise indicative of an image of the test chart 110. In one of such embodiments, e.g., embodiment 400 shown in FIG. 4, the control unit 150 can include one or more input/output (I/O) interfaces 430 that permit the exchange of information (e.g., data, metadata, and/or signaling) with at least the imaging device 130 or a component thereof. In other embodiments, the control unit 150 can be embodied in or can be included in a computer server, a rack-mountable unit, or other type of computing device that can be functionally coupled to the imaging device 130 via at least one of the I/O interface(s) 430. In certain aspects, the one or more I/O interfaces 430 can include one or more pins, connectors, and/or ports, including parallel ports (e.g., General Purpose Interface Bus (GPIB), IEEE-1284), serial ports (e.g., Recommended Standard (RS)-232, V.11, Universal Serial Bus (USB), FireWire or IEEE-1394, or the like), Ethernet ports, V.35 ports, X.21 ports, or dry contacts.

With further reference to FIG. 1, the control unit 150 can utilize or otherwise leverage the received image data to determine a separation distance $d_1$ between the two reference markings 112a and 112b in the image of the test chart 110. As such, in one embodiment, e.g., embodiment 400 shown in FIG. 4, the control unit 150 can include an imaging processing unit 410 that can analyze or otherwise process at least a portion of the image data to determine the separation distance $d_1$. Based at least on $d_1$, the control unit 150 can determine a defocus metric $\Delta_1 = d_1 - d_0$ for the image, where $d_0$ is the idealized or otherwise calibrated separation distance between the reference markings 112a and 112b. Accordingly, in one example, the control unit 150 can access $d_0$ from a memory device integrated into or otherwise coupled to the control unit 150. For instance, in the example embodiment 400 shown in FIG. 4, the control unit 150 can access information indicative of $d_0$ from one or more memory devices 440 (referred to as memory 440). The control unit 150 also can access other information, such as predetermined tolerances, magnitudes of distances that the lens assembly 120 is to be moved from an initial position towards or away from the imaging device 130 (or other imaging device in the camera module including the lens assembly 120) based on the magnitude of a defocus metric Δ, and/or relationships (e.g., linear relationships) between the magnitude of a displacement of the lens assembly 120 towards or away from the imaging device 130 and the defocus metric Δ.

The control unit 150 also can compare the defocus metric $\Delta_1$ to a predetermined tolerance parameter, such as a nominal distance between photosensitive elements in the imaging device 130. The predetermined tolerance parameter can be of the order of one to a few micrometers, for example. Based on an outcome of such a comparison, in one aspect, the control unit 150 can determine if the $\Delta_1$ is greater than, equal to, or less than the predetermined tolerance parameter (e.g., about 1.12 μm). In response to ascertaining or otherwise satisfactorily determining that $\Delta_1$ is greater than the predetermined tolerance, the control unit 150 can determine that the camera module including the lens assembly 120 is defocused. In addition, the control unit 150 can direct or otherwise cause the positioning mechanism 140 or a component thereof to adjust the position of the lens assembly 120 using the defocus metric $\Delta_1$. In the example embodiment 400 shown in FIG. 4, the control unit 150 can include a motion driver unit 420 that can utilize or otherwise leverage the magnitude and the sign of $\Delta_1$ to compose a motion directive for the positioning mechanism 140 including the magnitude and the direction of the desired displacement of the lens assembly 120. Therefore, in one example, the control unit 150 can determine that the defocus metric $\Delta_1$ is a positive number, and can include in the motion directive an indication or other type of information conveying that the lens assembly 120 is to be moved toward the imaging device 130. In the alternative, the control unit 150 can determine that the defocus metric $\Delta_1$ is a negative number, and can include in the motion directive an indication or other type of information conveying that the lens assembly 120 is to be moved away from the imaging device 130 and toward the test chart 110. The control unit 150 can transmit the motion directive to the positioning mechanism 140 via an I/O interface (such as one of the I/O interface(s) 430).

The positioning mechanism 140 or a component thereof can receive the motion directive conveying a magnitude and direction of a desired displacement for the lens assembly 120, and can cause the lens assembly to move according to the motion directive. After the displacement, the lens assembly 120 can be disposed at a distance L from the imaging device 130 along the optical axis 135 of the lens assembly 120. The control unit 150 can receive additional image data from the imaging device 130 or a component thereof, wherein at least a portion of such image data can be representative or otherwise indicative of an image of the test chart 110 in the new arrangement of the camera module including the lens assembly 120 and the imaging device 130. As part of the automated focusing of the camera module in accordance with this disclosure, the control unit 150 can repeat a computation cycle directly to evaluate a defocus metric in the new arrangement. Therefore, in at least certain aspects, the control unit 150 can utilize or otherwise leverage the additional image data to determine a separation distance $d_2$ between the two reference markings 112a and 112b in the image of the test chart 110 according to the new arrangement. The control unit 150 also can determine a defocus metric $\Delta_2 = d_2 - d_0$ and can compare $\Delta_2$ to the predetermined tolerance parameter for focusing. As described herein, based on an outcome of such a comparison, in one aspect, the control unit 150 can determine if the $\Delta_2$ is greater than, equal to, or less than the predetermined tolerance parameter (e.g., about 1.12 μm). In response to ascertaining or otherwise satisfactorily determining that $\Delta_2$ is greater than the predetermined tolerance, the control unit 150 can determine that the camera module including the lens assembly 120 is defocused. In addition, the control unit 150 can direct or otherwise cause the positioning mechanism 140 or a component thereof to adjust the position of the lens assembly 120 using the defocus metric $\Delta_2$.

It can appreciated that the cycle of displacement of the lens assembly 120 and computation of a defocus metric for an image of the two reference markings 112a and 112b may continue, resulting in a series of defocus metrics $\Delta_3$, $\Delta_4$, ... $\Delta_N$, and so forth. After a certain number of displacements, the cycle can converge and the camera module may be focused. As an illustration, in a scenario in which convergence is attained for N=2, the control unit 150 can determine that $\Delta_2$ is equal to or less than the predetermined tolerance parameter and can direct the positioning mechanism 140 or a component thereof to maintain (or lock) a current position of the lens assembly 120 with respect to the imaging device 130. In certain embodiments, the lens assembly 120 can be locked in order to affix or otherwise bond it to a housing of the camera module that includes the lens assembly 120. In one embodiment, e.g., example embodiment 400 shown in FIG. 4, the motion driver unit 420 can compose a locking directive and the controller 150 can transmit such a directive to the positioning mechanism 140 via one of the I/O interface(s) 430.

Figure 4:
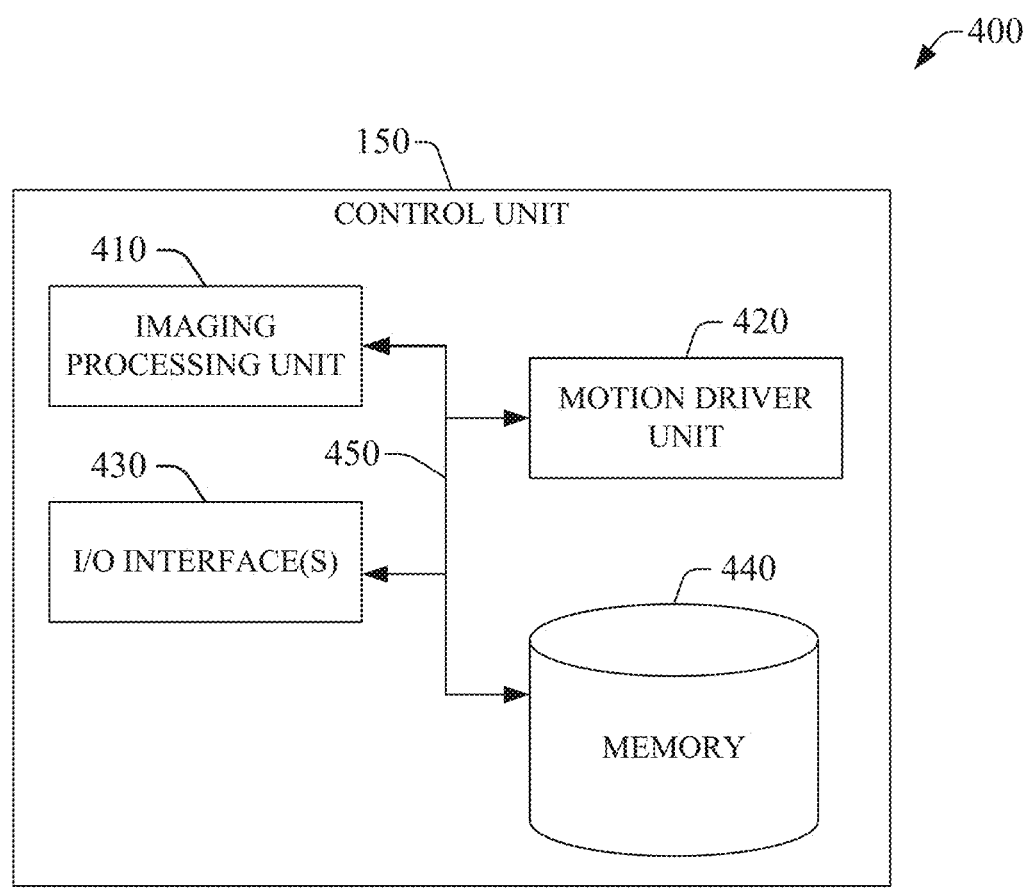
FIG. 4 presents an example of a control unit for automated focusing of a camera module in accordance with one or more embodiments of the disclosure.

With reference to FIG. 4, it should be appreciated that, in certain embodiments, each of the imaging processing unit 410 and the motion driver unit 420 can be embodied in or can include an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed or otherwise configured to perform the functions described herein. In other embodiments, the imaging processing unit 410 and the motion driver unit 420 can be integrated into a single unit (e.g., a single chipset or circuitry) that can provide the functionality of such units in accordance with aspects described herein. In addition, in the example embodiment 400, the control unit 150 can include a bus architecture 450 (also termed bus 450) that can functionally couple two or more of (i) the imaging processing unit 410, (ii) the motion driver unit 420, (iii) at least one of the I/O interface(s) 430, or (iv) the memory 440. The bus 450 can include at least one of a system bus, a power bus, a memory bus, an address bus, or a message bus, and can permit exchange of information (data, metadata, and/or signaling) between the imaging processing unit 410, the motion driver unit 420, at least one of the I/O interface(s) 430, and the memory 440. As such, in certain embodiments, the bus 450 can represent one or more of several possible types of bus structures, including a memory bus or memory controller, a peripheral bus, and/or a processor or local bus using any of a variety of bus architectures.

Figure 5:
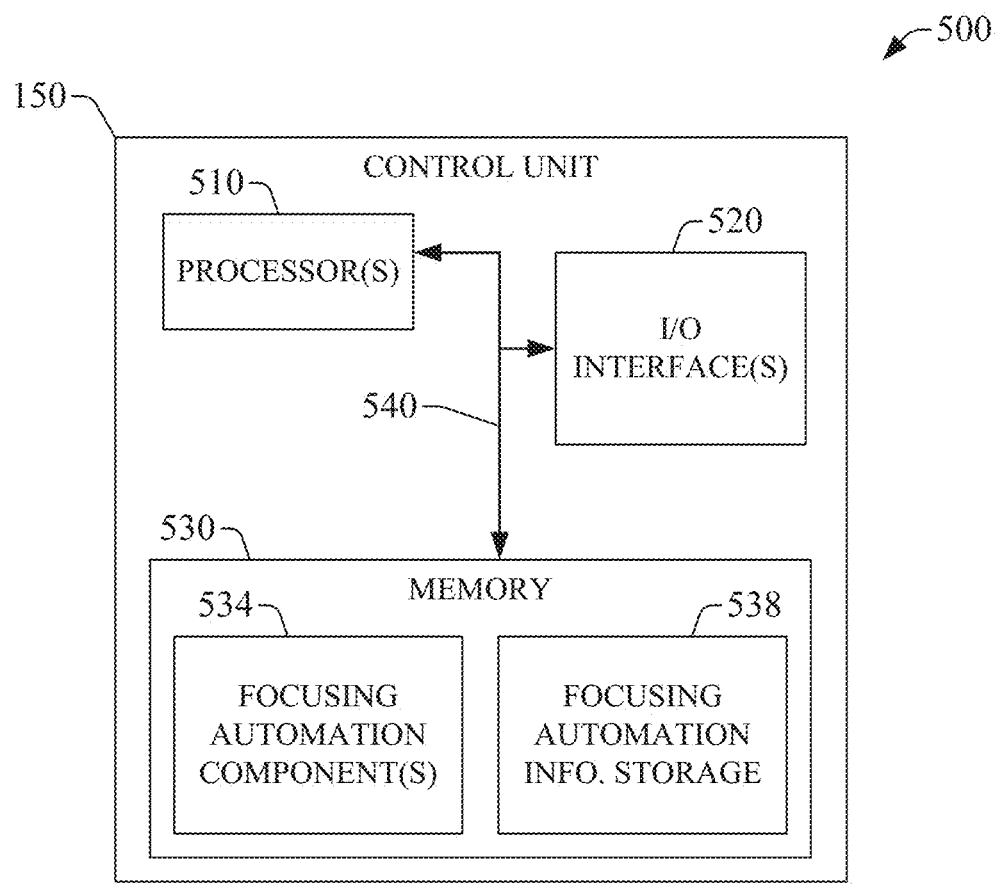
FIG. 5 presents another example of a control unit for automated focusing of a camera module in accordance with one or more embodiments of the disclosure.

In additional or alternative embodiments, the functionality of the control unit 150 in connection with the automated focusing of a camera module in production that is disclosed herein can be implemented or otherwise performed in response to execution of one or more software components at the control unit 150. As such, FIG. 5 presents an example embodiment 500 of the control unit 150 for automated focusing of a camera module in accordance with one or more aspects of the disclosure. As illustrated, in such an embodiment, the control unit 150 can include one or more processors 510, one or more I/O interfaces 520, one or more memory devices 530 (referred to as memory 530), and a bus architecture 540 (also termed bus 540) that can functionally couple two or more of such functional elements. In certain aspects, the automated focusing functionality described herein in connection with the control unit 150 can be performed in response to execution of one or more machine-accessible instructions (e.g., computer-readable instructions and/or computer executable instructions) retained in one or more memory elements in a memory 530 by the at least one of the processor(s) 510. The one or more machine-accessible instructions can embody or can include control logic for operation of the control unit in accordance with one or more aspects described herein. Accordingly, in one aspect, such machine-accessible instruction(s) can be referred to as control instruction(s), which embody or include one or more software components. The memory element(s) containing the machine-accessible instruction(s) are represented as focusing automation component(s) 534. The one or more machine-accessible instructions contained within the focusing automation component(s) 534 can include various programming code instructions according to programming languages of various complexity (assembler, ladder logic, high-level programming language, etc.) and suitable for execution by at least one of the processor(s) 510. It should be appreciated that the one or more software components can render the control unit 150, or any other computing device that contains such components, a particular machine for detection and application of a stimulus as described herein, among other functional purposes.

In one scenario, for example, at least a portion of the control instructions can embody a portion of the example method presented in FIG. 10 described hereinafter. For instance, to embody such a method, at least the portion of the control instructions can be retained (e.g., encoded or otherwise made available) in a computer-readable non-transitory storage medium and executed by one or more of the processor(s) 510. The one or more computer-accessible instructions that embody a software component can be assembled into one or more program modules, for example, that can be compiled, linked, and/or executed at the control unit 150 or other computing devices. Generally, such program modules include computer code, routines, programs, objects, components, information structures (e.g., data structures and/or metadata structures), etc., that can perform particular tasks (e.g., one or more operations) in response to execution by one or more processors, which can be integrated into the control unit 150 or be functionally coupled thereto.

As illustrated and described herein, the control unit 150 can include one or more processors 510, one or more I/O interfaces 520, a memory 530, and a bus 540 (which can functionally couple various functional elements of the control unit 150.) The bus 540 can include at least one of a system bus, a power bus, a memory bus, an address bus, or a message bus, and can permit exchange of information (data, metadata, and/or signaling) between the processor(s) 510, the input/output (I/O) interface(s) 520, and/or the memory 530, or respective functional element therein.

The I/O interface(s) 520 permit communication of information between the control unit 150 and one or more electronic or electromechanical devices, including the positioning mechanism 140. Such communication can include direct communication or indirect communication, such as exchange of information between the control unit 150 and at least one of the electronic or electromechanical device(s) via a network or elements thereof. In certain embodiments, the I/O interface(s) 520 can include one or more of display units (not shown) and associated functional elements (e.g., lights, such as light-emitting diodes; a display, such as a liquid crystal display (LCD), combinations thereof, or the like) that can permit control of the operation of the control unit 150, or can permit conveying or revealing operational conditions of the control unit 150.

In one aspect, the bus 540 represents one or more of several possible types of bus structures, including a memory bus or memory controller, a peripheral bus, an accelerated graphics port, and a processor or local bus using any of a variety of bus architectures. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnect (PCI), a PCI-Express bus, a Personal Computer Memory Card Industry Association (PCMCIA), Universal Serial Bus (USB) and the like. The bus 540, and all buses described herein can be implemented, in at least certain embodiments, over a wired or wireless network connection and each of the subsystems, including the processor(s) 510, the memory 530 and memory elements therein.

As described herein, the control unit 150 can include a variety of computer-readable media. Computer readable media can be any available media (transitory and non-transitory) that can be accessed by a computing device. In one aspect, computer-readable media can include computer non-transitory storage media (or computer-readable non-transitory storage media) and communications media. Example computer-readable non-transitory media can be any available media that can be accessed by the control unit 150, and can include, for example, both volatile and non-volatile media, and removable and/or non-removable media. In one aspect, the one or more memory devices 530 (represented as memory 530) can include computer-readable media in the form of volatile memory, such as random access memory (RAM), and/or non-volatile memory, such as read-only memory (ROM).

It should be appreciated that, in one aspect, a processor of the processor(s) 510 that executes one or more control instructions can retrieve information from or retain information in the memory 530 in order to operate in accordance with the functionality programmed or otherwise configured by focusing automation component(s) 534. Such information can include at least one of code instructions or other signaling, information structures, or the like. In certain embodiments, at least one of the I/O interface(s) 520 can permit or facilitate communication of information between two or more components within the focusing automation component(s) 534. The information that is communicated by the at least one interface can result from implementation of one or more operations in a method of the disclosure. In certain embodiments, one or more of the focusing automation component(s) 534 and/or the focusing automation information (info.) storage 538 can be embodied in or can include removable/non-removable, volatile/non-volatile computer storage media.

At least a portion of at least one of the focusing automation component(s) 534 or the focusing automation information storage 538 can program or otherwise configure one or more of the processors 510 to operate at least in accordance with the functionality described herein. In addition or in other embodiments, the focusing automation information storage 538 can include information indicative of a reference separation distance between reference markings in a test chart (e.g., distance $d_0$); predetermined tolerances utilized to evaluate focusing quality based on a defocus metric $\Delta$; magnitudes of distances that a lens assembly in a camera module (e.g., lens assembly 120) is to be moved from an initial position towards or away from an imaging device in the camera module based on the magnitude of the defocus metric $\Delta$; and/or relationships (e.g., linear relationships) between the magnitude of a displacement of such a lens assembly towards or away from the imaging device and the defocus metric $\Delta$.

In addition, the memory 530 can include computer-accessible instructions and information (e.g., data and/or metadata) that permit or facilitate operation and/or administration (e.g., upgrades, software installation, any other configuration, or the like) of the control unit 150. Accordingly, the memory 530 can contain one or more program modules that embody or include one or more OSs, such as the Windows operating system, Unix, Linux, Symbian, Android, Chromium, and substantially any OS suitable for mobile computing devices or tethered computing devices. In one aspect, the operational and/or architectural complexity of the control unit 150 can dictate a suitable OS. The memory 530 also can include data and/or metadata that can permit or facilitate operation and/or administration of the control unit 150.

It should be recognized that while the focusing automation component(s) 534 and other executable program components, such as OS instruction(s), are illustrated herein as discrete blocks, such software components can reside at various times in different memory components (not shown) of the control unit 150, and can be executed by at least one of the processor(s) 510.

Figure 6:
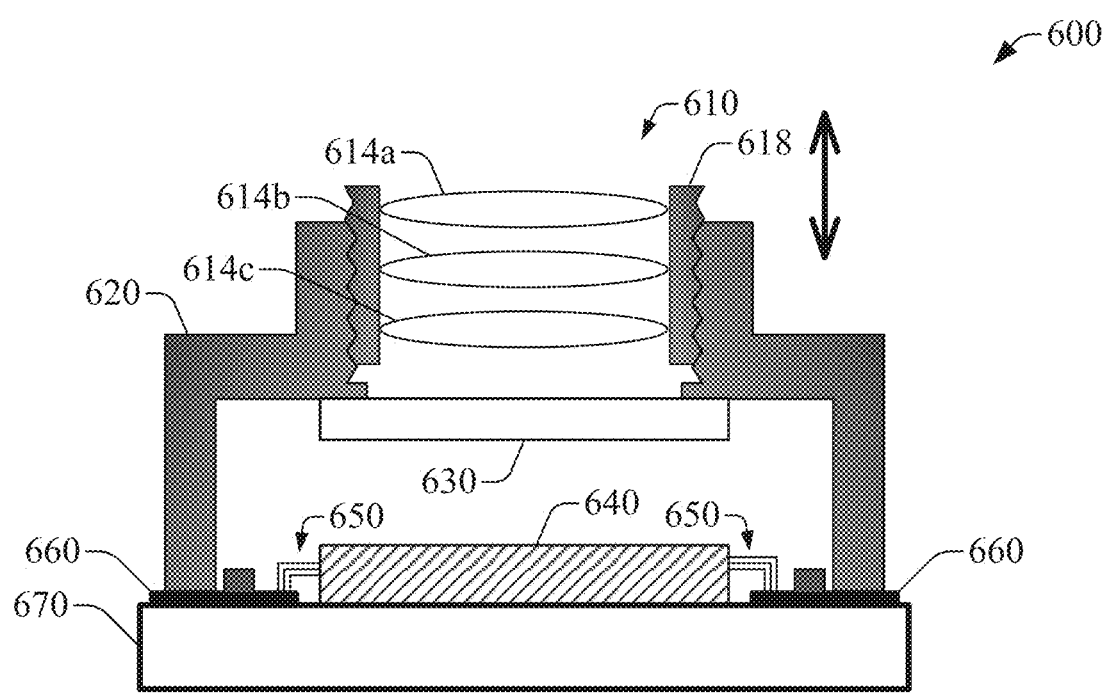
FIGS. 6-7 present examples of camera modules in accordance with one or more embodiments of the disclosure.

FIG. 6 presents a side-view diagram of an example camera module 600 in accordance with one or more embodiments of the disclosure. The camera module 600 can include a lens assembly 610 mounted or otherwise attached to a housing 620. As illustrated, the lens assembly 610 can include a set of three lenses 614a, 614b, and 614c attached to a casing 618. Each of the lenses 614a, 614b, and 614c can be embodied in a convex lens or a concave lens. Either of such a convex lens or concave lens can be made from a solid material (such as glass, plastic, or quartz) that can be transparent to electromagnetic radiation in the visible or non-visible portion of the electromagnetic spectrum. It should be appreciated that in certain embodiments, more or less than three lenses can be included in the lens assembly 610. In certain embodiments, the lens assembly 610 can embody or can include the lens assembly 120. As illustrated, in one embodiment, each of the casing 618 and the housing 620 can define a thread that can permit threading the lens assembly 610 into the housing 620. As such, the lens assembly 610 can be movably mounted to the housing 620, permitting movement of the lens assembly 610 along an axis thereof. The movement is represented with a thick arrow in FIG. 6.

The camera module 600 also can include a filter 630 that can prevent propagation of unwanted monochromatic or polychromatic light onto an imaging device 640 of the camera module 600. In one example, the monochromatic light can include a single wavelength in the visible portion of the electromagnetic spectrum, and therefore the filter 630 can be referred to as a color filter. In another example, the polychromatic light can include wavelengths in a specific portion of the electromagnetic spectrum, such as the infrared (IR) portion, and therefore the filter 630 can be referred to as an IR cut filter. Filtering light in the IR can reduce imaging artifacts in an image formed at the imaging device 640.

As described herein, the imaging device 640 (or imager 640) can be embodied in or can include a red-green-blue (RGB) color light sensor, a digital color light sensor, and/or other type of light sensors. Accordingly, in certain embodiments, the imaging device 640 can include one or more photodetectors (an array of photodiodes, for example), active amplifiers, and/or filters. The imaging device 640 can be disposed onto a solid substrate 670. More specifically, yet not exclusively, the imaging device 640 can be embodied in a semiconductor-based sensor including multiple semiconducting photosensitive elements (herein generally referred to as pixel sensors or pixels). In one example, the imaging device 640 can be embodied in or can include a charge-coupled device (CCD) camera; an active-pixel sensor or other type of complementary metal-oxide semiconductor (CMOS) based photodetector; an array of multi-channel photodiodes; a combination thereof; or the like. In one example, the imaging device 640 can generate an electric signal (e.g., an electric current) representative of an image formed on a surface thereof. In one example, each of the multiple semiconducting photosensitive elements can produce an electric signal having an amplitude (and possibly a phase) representative of the intensity of light incident thereon. Accordingly, the imaging device 640 can include one or more electrically conductive elements 650, such as metallic viases or other types of metallic wires, electrically coupled to a conductive pad 660 or other type of electric contact disposed on the substrate 670. The conductive elements(s) 650 can permit transmitting an electrical signal to a component, such as the control unit 150, or a device functionally coupled to the camera module 600.

As illustrated, the substrate 670 can be assembled (e.g., machined or otherwise manufactured) to receive the at least an end of the housing 620. In one example, the housing 620 can be mechanically attached (e.g., glued, bolted, or the like) to the substrate 670. The substrate 670 also can include a connector member (not shown) that can permit mounting or otherwise attaching the camera module 600 to a housing or other structure of a portable electronic device.

Figure 7:
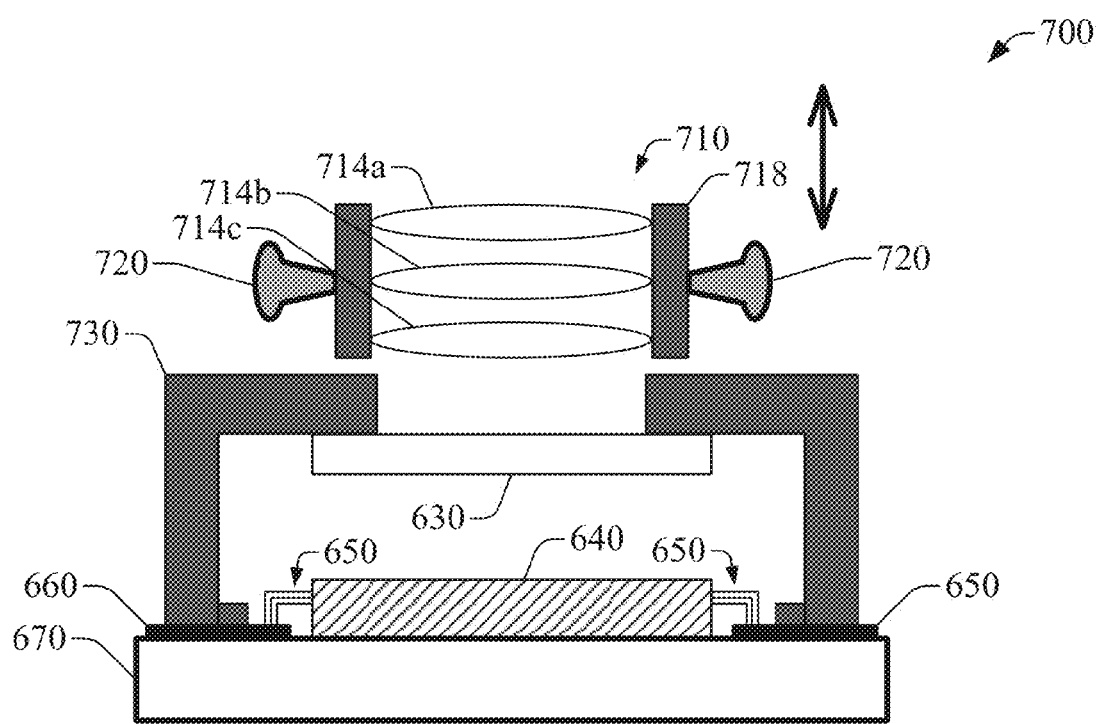

FIG. 7 presents a side-view diagram of an example camera module 700 in accordance with one or more embodiments of the disclosure. The camera module 700 can include a lens assembly 710 that can be affixed, during production, for example, to a housing 730. As illustrated, the lens assembly 710 can include a set of three lenses 714a, 714b, and 714c attached to a casing 718. In contrast to the casing 618, the casing 718 does not include or otherwise define a thread. Each of the lenses 714a, 714b, and 714c can be embodied in a convex lens or a concave lens. Either of such a convex lens or concave lens can be made from a solid material (such as glass, plastic, or quartz) that can be transparent to electromagnetic radiation in the visible or non-visible portion of the electromagnetic spectrum. While three lenses are illustrated, it should be appreciated that the disclosure is not so limited and, in certain embodiments, more or less than three lenses and/or other types of optical elements—e.g., mirrors, filters, polarizers, collimators, and the like—can be included in the lens assembly 710. In certain embodiments, the lens assembly 710 can embody or can include the lens assembly 120 presented in FIG. 1. The camera module 700 also can include other functional elements that have been described in connection with the camera module 600.

In the illustrated embodiment, an active alignment mechanism 720 can position the lens assembly with respect to the housing 730, at a certain distance from the imaging device 640. In certain embodiments, the active alignment mechanism 720 also can move the lens assembly with respect to a housing 730, placing the lens assembly 710 at various distances from the imaging device 640. To that end, in one example, the active alignment mechanism 720 can be embodied in or can include a clamping mechanism that can be controlled via a control unit (such as the control unit 150) in order to move the lens assembly 710 along or substantially along the optical axis of the lens assembly 710. Such movement is represented with a thick arrow in FIG. 7. It can be appreciated that, in certain embodiments, the active alignment mechanism 720 can embody or can constitute the positioning mechanism 140.

A gap of variable size may be present between the housing 730 and the lens assembly 710. The size of the gap can be determined by the movement of the lens assembly 710 towards or away from the imaging device 640. After or upon identifying a suitable position of the lens assembly 710 with respect to the housing 730 in accordance with this disclosure, the active alignment mechanism 720 can maintain the position of the lens assembly 710 and the gap can be filled with an adhesive or other type of substance that can permit affixing or otherwise bonding the lens assembly 710 to the housing 730. The identified position can permit the camera module 700 to provide satisfactory focusing, and thus, the camera module 700 is said to be focused.

Figure 8:
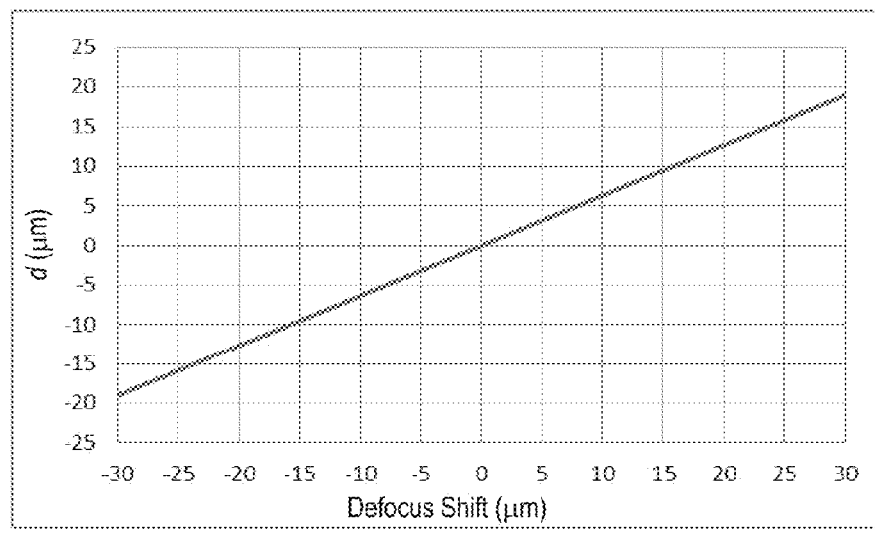
FIGS. 8-9 present calculations of a defocus metric in example camera modules in accordance with example embodiments of the disclosure.

In order to illustrate the magnitude of certain optical parameters related to the automated focusing in accordance with this disclosure, FIG. 8 presents calculations of a defocus metric (A) and other optical parameters for an idealized fixed-focus camera module in a commercially available portable communication device. In the calculations, the top and bottom bars in the test chart 350 shown in FIG. 3B are considered as the reference markings described herein. The physical separation, e.g., the spacing of the reference markings on the test chart 350 is about 390 mm. In addition, the test chart 350 is considered to be placed at about 60 cm from a camera of the portable communication device. The camera includes a lens assembly and an imaging device. In the table 800, the defocus shift corresponds to the difference between the position (L) of the lens assembly relative to the imaging device and the focal length (f) of the lens assembly. As illustrated, the spacing $d_0$ between the reference markings at zero defocus shift, e.g., L=f, is about 1.1273 mm. In addition, the table 800 also presents results for the distance d corresponding to the separation between the reference markings in an image formed by the imaging device of the portable communication device. Also shown is the defocus metric $\Delta=d-d_0$. Further, the table 800 also presents the value of $\Delta$ expressed in units of pixel size (or size of a photosensitive element) in the imaging device. Such a representation of the value of $\Delta$ permits determining the defocus shift that can be resolved in the automated focusing of this disclosure. As shown, the calculations convey that a defocus shift of 5 μm can produce changes in the image of the test chart that can be resolved by the imaging device present in the portable communication device.

The chart 850 presents the relationship between d and the defocus shift. It can be readily gleaned from the results that there is a linear relationship between the d and the defocus shift in the considered FF camera module.

Figure 9:
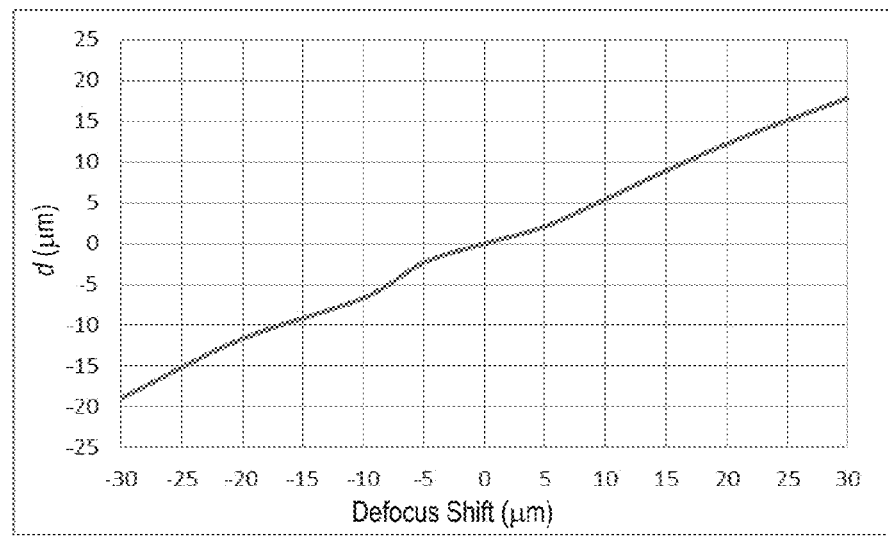

As a further illustration, FIG. 9 presents simulations of a defocus metric (Δ) and other optical parameters for an actual FF camera module present in a commercially available portable communication device. It can be readily gleaned from the table 900 and the chart 950 that the simulated values are similar to the results in the idealized calculation. As shown in the chart 950, the distance d and the defocus shift present a nearly linear relationship. In addition, a defocus shift of 5 mm also can be resolved in the actual FF camera module.

Figure 10:
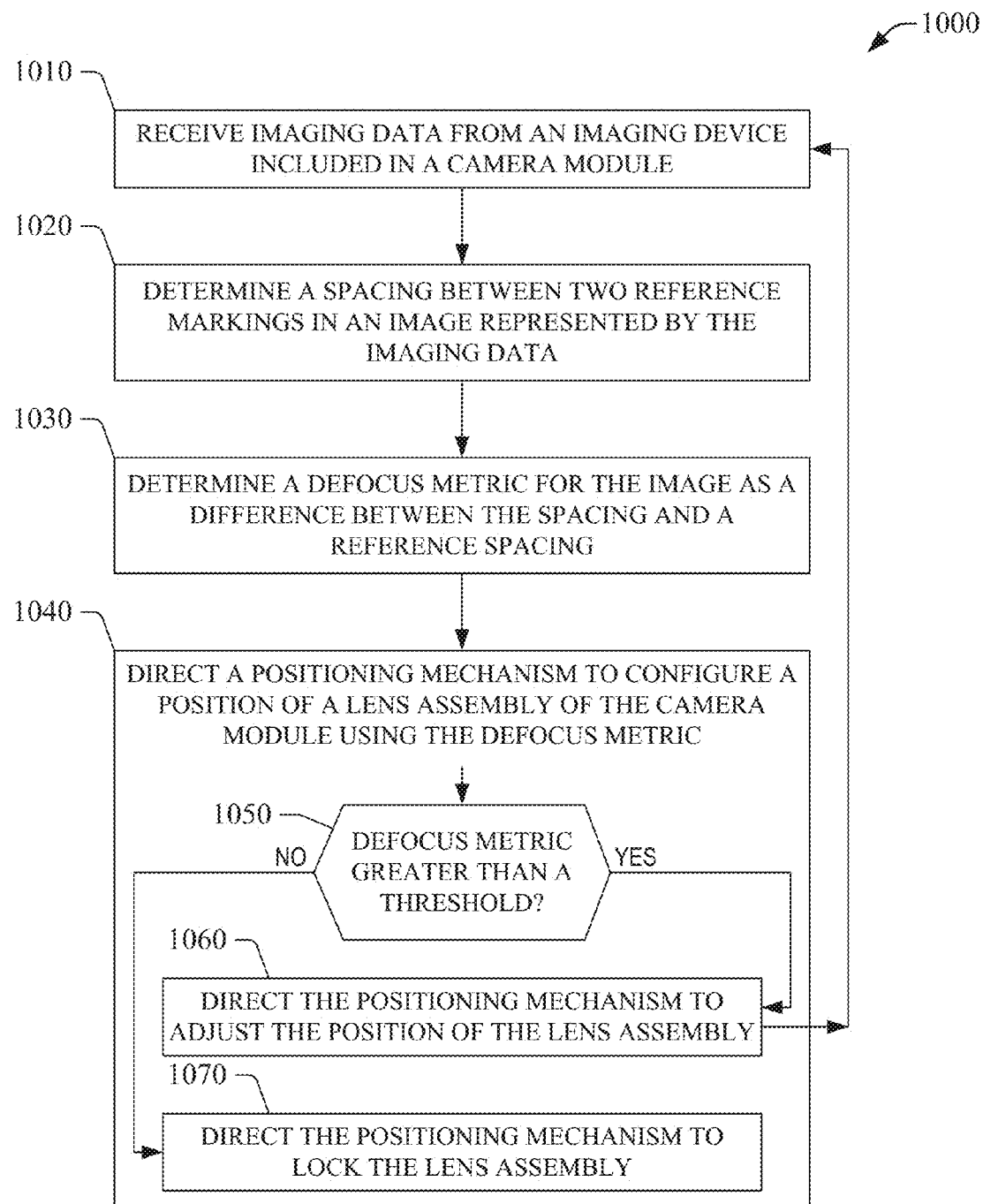
FIG. 10 presents an example of a method for automated focusing in a camera module in accordance with one or more embodiments of the disclosure.

In view of the aspects described herein, example methods that can be implemented in accordance with the disclosure can be better appreciated with reference, for example, to the flowchart in FIG. 10. For purposes of simplicity of explanation, the example methods disclosed herein are presented and described as a series of blocks (with each block representing an action or an operation in a method, for example). However, it is to be understood and appreciated that the disclosed methods are not limited by the order of the blocks and associated actions or operations, because some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or aspects described herein.

It should be appreciated that the methods in accordance with this disclosure can be retained on an article of manufacture, or computer-readable medium, to permit or facilitate transporting and transferring such methods to a computing device (such as an electronic device of this disclosure; a programmable logic controller; or the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement one or more of the disclosed methods. The code instructions can provide a computer-executable or machine-executable framework to implement the methods described herein.

FIG. 10 presents a flowchart of an example method 1000 for automated focusing of a camera module in production according to one or more aspects of the disclosure. The camera module can be embodied in or can include an FF camera module or an AF camera module. A computing device having one or more processors coupled to one or more memory devices can implement (e.g., compile, execute, compile and execute, or the like) one or more blocks of the subject example method. In one example, the control unit 150 can implement the subject example method. At block 1010, the computing device can receive image data from an imaging device (such as an array of light sensors and associated circuitry) included in the camera module. The image data can be representative or otherwise indicative of an image of a test chart having at least two reference markings (e.g., markings 112a and 112b). As described herein, in order to generate the image data, the imaging device relies on a lens assembly of the camera module to receive or otherwise collect light reflected off the test chart. As such, prior to block 1010, the lens assembly can be positioned or otherwise disposed at an initial distance (which may be referred to as pre-height) from the imaging device corresponding to a nominal focal length f of the lens assembly. The magnitude of f can be previously determined or can be otherwise available based on the specific architecture or configuration of one or more lenses and other optical elements included in the lens assembly. In one example, the nominal focal length f can be a nominal back focal length of the length assembly. The computing device or other type of controller can direct a positioning mechanism to dispose the lens assembly at such an initial distance. It should be appreciated that block 1010 may or may not be implemented immediately after such an initial configuration of the lens assembly, which may have been positioned at other distances relative to the imaging device during the intervening interval between initial configuration and implementation of block 1010.

At block 1020, the computing device can determine a spacing d between two of the at least two reference markings in the image using the image data. At block 1030, the computing device can determine a defocus metric (Δ) for the image as a difference between the spacing d and a reference spacing $d_0$ (which also may be referred to as a calibrated spacing). In one implementation, information indicative of $d_0$ can be retained in a memory device of the one or more memory devices. The computing device or a component thereof (e.g., a processor of the one or more processors) can access the memory to obtain the information indicative of $d_0$ and determine (e.g., compute) Δ. At block 1040, the computing device can direct a positioning mechanism to configure the position of a lens assembly of the camera module using the defocus metric. In certain embodiments, the positioning mechanism can be embodied in or can include the positioning mechanism 140, and the lens assembly can be embodied in the lens assembly 120.

As illustrated, in certain embodiments, block 1040 can include block 1050, at which the computing device can determine if the defocus metric is greater than a predetermined threshold. The predetermined quality threshold can establish a satisfactory focusing quality for the camera module. As described herein, the predetermined threshold can be determined by the specific structure of the imaging device. For instance, the predetermined threshold (which also may be referred to as a "quality threshold") can be equal to a nominal spacing between photosensitive elements (e.g., photodetectors, such as photodiodes) in the imaging device. In one example, the nominal spacing can be at least 1.12 μm. In response to ascertaining or otherwise satisfactorily establishing that Δ is greater than the predetermined threshold (e.g., about 1.12 μm or greater), at block 1060, the computing device can direct the positioning mechanism to adjust the position of the lens assembly within the camera module. In one aspect, the positioning mechanism can be directed to adjust the position of the lens-assembly by a distance determined by the magnitude of the defocus metric in a direction determined by a sign of the defocus metric. More specifically, the computing device can direct the positioning mechanism move the lens assembly relative to the imaging device by a distance determined by the magnitude of the defocus metric in a direction determined by the sign of the defocus metric. In one example, the computing device can determine that the defocus metric is a positive number and, in response, can direct the positioning mechanism to move the lens assembly by a predetermined distance towards the imaging device. In another example, the computing device can determine that the defocus metric is a negative number and, in response, can direct the positioning mechanism to move the lens assembly a predetermined distance away from the imaging device.

Subsequent to the implementation of block 1060, flow can continue to block 1010. In the alternative, in response to ascertaining or otherwise satisfactorily establishing that Δ is equal to or less than the predetermined threshold, at block 1070, the computing device can direct the positioning mechanism to lock the lens assembly in its current position or otherwise cease to move the lens assembly with respect to the imaging device (e.g., an RGB light sensor). As described herein, the current position of the lens assembly can be maintained in order to affix the lens assembly to a housing of the camera module, and proceed with a mass product flow for the camera module.

It should be appreciated that, in at least certain embodiments, the example method 1000 may not include successive evaluation of multiple regions of interest (referred to as "ROIs") in the test chart or other types of assessments of imaging quality of the camera module for each arrangement of the lens assembly relative to the imaging device. Instead, in certain embodiments, the example method 1000 can include an evaluation block (not shown) at which ROIs or other assessments can be performed after having achieved a satisfactory focusing quality. As such, implementation of the example method 1000 can achieve a satisfactory focusing quality at a reduced processing time compared to conventional technologies for automated focusing of camera modules during assembly.

In certain mass production flows for camera modules, the example method 1000 can replace a conventional automated focusing test and/or calibration stage in EOL integration processing flows for assembly of camera modules. Based at least on the reductions in processing time for achieving a satisfactory or otherwise desired focusing quality for a camera module, embodiments of the example method 1000 can provide substantial speed-ups over conventional technologies for automated focusing of camera modules. The embodiments of the disclosure can increase the number of units per hour in production, with the ensuing reduction in cost. In certain scenarios, cost may be reduced by a factor of about six. Other contributions of the example method 1000 and other techniques for automated focusing of camera modules in accordance with aspects of this disclosure can include improved image quality of the camera module due to, for example, (i) the reduced optical decentering and/or tilt of the lens assembly with respect to an axis of the camera module, and/or (ii) the reduced presence of particulates or other types of contaminants in the camera module after achieving a satisfactory focusing quality.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," and "module" and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, and the electronic components can include a processor therein to execute software or firmware that provides, at least in part, the functionality of the electronic components. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electromechanical coupling mechanisms (such as conduits, connectors, combinations thereof, or the like). An interface can include input/output (I/O) components as well as associated processor, application, and/or other programming components. The terms "component," "environment," "system," "architecture," "interface," "unit," and "module" can be utilized interchangeably and can be referred to collectively as functional elements.

As utilized in this disclosure, the term "processor" can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," storage," "data store," "data storage," "memory," "repository," and substantially any other information storage component relevant to the operation and functionality of a component of the disclosure, refer to "memory components," entities embodied in a "memory," or components forming the memory. It can be appreciated that the memory components or memories described herein embody or include non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROM, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can permit, in at least certain embodiments, automated focusing of a camera module during production thereof. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
receiving image data from a red-green-blue (RGB) light sensor included in a camera module, the image data being representative of an image of a test chart having two reference markings;
determining a separation distance between the two reference markings in the image;
determining a defocus metric for the image, wherein the defocus metric is a difference between the separation distance and a reference separation distance between the two reference markings, and wherein the reference separation distance is a spacing between the two reference markings in a focused image of the test chart obtained by the camera module;
determining that a magnitude of the defocus metric is greater than a magnitude of a tolerance parameter;
directing a positioning mechanism to move a lens assembly of the camera module by a distance determined by the magnitude of the defocus metric and in a direction determined by a sign of the defocus metric;
receiving second image data from the RGB light sensor after the lens assembly is moved, the second image data being representative of a second image of the test chart;
determining a second separation distance between the two reference markings in the second image;
determining a second defocus metric for the second image as a difference between the second separation distance and the reference separation distance;
determining that a second magnitude of the second defocus metric is equal to or less than a second magnitude of the tolerance parameter; and
directing the positioning mechanism to maintain a current position of the lens assembly with respect to the RGB light sensor, and the current position is maintained to affix the lens assembly to a housing of the camera module.

2. The method of claim 1, wherein directing the positioning mechanism to move the lens assembly comprises determining that the defocus metric is a positive number, and
directing the positioning mechanism to move the lens assembly, from an initial position, by a predetermined distance towards the RGB light sensor.

3. The method of claim 1, wherein directing the positioning mechanism to move the lens assembly of the camera module comprises determining that the defocus metric is a negative number, and
directing the positioning mechanism to move the lens assembly, from an initial position, by a predetermined distance away from the RGB light sensor.

4. The method of claim 1, further comprising positioning the lens assembly at an initial distance from the RGB light sensor, the initial distance corresponding to a nominal back focal length of the lens assembly.

5. The method of claim 1, wherein the RGB light sensor comprises multiple photodetectors, each configured to receive light and to generate an imaging signal in response to the received light, and
wherein determining that the magnitude of the defocus metric is greater than the magnitude of the tolerance parameter comprises determining that the magnitude of the defocus metric is greater than a separation distance between a pair of the multiple photo detectors.

6. A control device, comprising:
at least one memory device having instructions encoded thereon; and
at least one processor coupled to the at least one memory device and configured, by at least a portion of the instructions, to at least:
receive image data from an imaging device included in a camera module, the image data being representative of an image including at least two reference markings;
determine a spacing between the two reference markings in the image;
determine a defocus metric for the image as a difference between the spacing and a reference spacing; and
direct a positioning mechanism to adjust the position of a lens assembly of the camera module by a distance determined by a magnitude of the defocus metric in a direction determined by a sign of the defocus metric.

7. The control device of claim 6, wherein the at least one processor is further configured, by at least the portion of the instructions, to determine that a magnitude of the defocus metric is greater than a predetermined threshold, and
to direct the positioning mechanism to move the lens assembly relative to the imaging device by a distance determined by the magnitude of the defocus metric in a direction determined by the sign of the defocus metric.

8. The control device of claim 6, wherein the at least one processor is further configured, by at least the portion of the instructions, to determine that the defocus metric is a positive number, and
to direct the positioning mechanism to move the lens assembly by a predetermined distance towards the imaging device.

9. The control device of claim 6, wherein the at least one processor is further configured, by at least the portion of the instructions, to determine that the defocus metric is a negative number, and
to direct the positioning mechanism to move the lens assembly a predetermined distance away from the imaging device.

10. The control device of claim 6, wherein the at least one processor is further configured, by at least the portion of the instructions, to determine that a magnitude of the defocus metric is equal to or less than the predetermined threshold, and
to direct the positioning mechanism to lock the lens assembly in its current position.

11. The control device of claim 7, wherein the imaging device includes multiple photosensitive elements, and wherein the at least one processor is further configured, by at least the portion of the instructions, to determine that the magnitude of the defocus metric is greater than a separation between a pair of the multiple photosensitive elements.

12. The control device of claim 6, wherein the image represents a test chart including a spatial frequency response (SFR) chart.

13. The control device of claim 6, wherein each of the two reference markings has a predetermined shape, and wherein a first marking of the two reference markings is disposed in the test chart at a predetermined orientation relative to a second marking of the two reference markings, the predetermined orientation being one of a vertical orientation, a horizontal orientation, or an orientation along a direction having an inclination different from zero degrees or 90 degrees.

14. The control device of claim 6, wherein the at least one processor is further configured, by at least the portion of the instructions, to direct the positioning mechanism to place the lens assembly at an initial distance from the imaging device corresponding to a nominal back focal length of the lens assembly.

15. At least one non-transitory computer-readable storage medium comprising instructions, that when executed, cause a controller to perform operations comprising:
receiving image data from an imaging device included in a camera module, the image data being representative of an image including at least two reference markings;
determining a spacing between the two reference markings in the image;
determining a defocus metric for the image as a difference between the spacing and a reference spacing; and
directing a positioning mechanism to adjust the position of a lens assembly of the camera module by a distance determined by a magnitude of the defocus metric in a direction determined by a sign of the defocus metric.

16. The at least one non-transitory computer-readable storage medium of claim 15, wherein the operations further comprise determining that the magnitude of the defocus metric is greater than a predetermined threshold, and
directing the positioning mechanism to move the lens assembly relative to the imaging device by a distance determined by the magnitude of the defocus metric in a direction determined by the sign of the defocus metric.

17. The at least one non-transitory computer-readable storage medium of claim 15, wherein the operations further comprise determining that the defocus metric is a positive number, and
directing the positioning mechanism to move the lens assembly by a predetermined distance towards the imaging device.

18. The at least one non-transitory computer-readable storage medium of claim 15, wherein the operations further comprise determining that the defocus metric is a negative number, and
directing the positioning mechanism to move the lens assembly by a predetermined distance away from the imaging device.

19. The at least one non-transitory computer-readable storage medium of claim 15, wherein the operations further comprise determining that a magnitude of the defocus metric is equal to or less than the predetermined threshold, and
directing the positioning mechanism to lock the lens assembly in its current position.

20. The at least one non-transitory computer-readable storage medium of claim 15, wherein the operations further comprise directing the positioning mechanism to place the lens assembly at an initial distance from the imaging device corresponding to a nominal back focal length of the lens assembly.

* * * * *